(12) United States Patent
Lu

(10) Patent No.: US 12,164,729 B2
(45) Date of Patent: Dec. 10, 2024

(54) BEAM TRANSMITTER AND OPTICAL TOUCH DISPLAY SYSTEM

(71) Applicant: TCL CHINA STAR OPTOELECTRONICS TECHNOLOGY CO., LTD., Guangdong (CN)

(72) Inventor: Zhitao Lu, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/755,874

(22) PCT Filed: Apr. 24, 2022

(86) PCT No.: PCT/CN2022/088720
§ 371 (c)(1),
(2) Date: May 10, 2022

(87) PCT Pub. No.: WO2023/197366
PCT Pub. Date: Oct. 19, 2023

(65) Prior Publication Data
US 2024/0152236 A1    May 9, 2024

(30) Foreign Application Priority Data

Apr. 14, 2022    (CN) .......................... 202210392991.7

(51) Int. Cl.
*G06F 3/042*  (2006.01)
*G06F 3/041*  (2006.01)

(52) U.S. Cl.
CPC .......... *G06F 3/0421* (2013.01); *G06F 3/0414* (2013.01); *G06F 3/0416* (2013.01)

(58) Field of Classification Search
USPC .......................................................... 345/175
See application file for complete search history.

(56) References Cited

U.S. PATENT DOCUMENTS

| 7,102,119 B1* | 9/2006 | Breslow | A63B 67/002 |
| | | | 250/221 |
| 9,870,076 B1* | 1/2018 | Hou | G06F 3/03542 |

(Continued)

FOREIGN PATENT DOCUMENTS

| CN | 101020400 A | 8/2007 |
| CN | 101833385 A | 9/2010 |

(Continued)

OTHER PUBLICATIONS

International Search Report in International application No. PCT/CN2022/088720, mailed on Nov. 25, 2022.

(Continued)

*Primary Examiner* — Chineyere D Wills-Burns
(74) *Attorney, Agent, or Firm* — PV IP PC; Wei Te Chung

(57) ABSTRACT

A beam transmitter and an optical touch display system are disclosed. The beam transmitter includes a first light source, a second light source, a power supply component, a touch sensor, and a control module. The beam transmitter includes a first projection state and a second projection state. The control module is respectively connected to the power supply component, the touch sensor, the first light source, and the second light source, and the control module controls the beam transmitter to switch between the first projection state and the second projection state according to a state of the touch sensor.

20 Claims, 5 Drawing Sheets

(56) References Cited

U.S. PATENT DOCUMENTS

| | | | | |
|---|---|---|---|---|
| 2004/0188925 | A1* | 9/2004 | Schuller | B65H 31/26 |
| | | | | 271/207 |
| 2011/0102373 | A1* | 5/2011 | Chang | G06F 3/03545 |
| | | | | 345/182 |
| 2011/0114634 | A1* | 5/2011 | Nevarez | A47J 37/045 |
| | | | | 392/416 |
| 2011/0157007 | A1* | 6/2011 | Chen | G06F 3/03545 |
| | | | | 345/156 |
| 2013/0162527 | A1 | 6/2013 | Dahl | |
| 2014/0293231 | A1* | 10/2014 | Yoon | G06F 3/0423 |
| | | | | 353/31 |
| 2015/0237292 | A1* | 8/2015 | Tsai | H04N 5/74 |
| | | | | 353/30 |
| 2015/0338667 | A1* | 11/2015 | Na | G06F 3/033 |
| | | | | 353/42 |
| 2023/0308618 | A1* | 9/2023 | Hsieh | H04N 9/312 |

FOREIGN PATENT DOCUMENTS

| | | |
|---|---|---|
| CN | 201654694 U | 11/2010 |
| CN | 110399050 A | 11/2019 |
| CN | 111474735 A | 7/2020 |
| CN | 111524917 A | 8/2020 |
| CN | 113126789 A | 7/2021 |
| CN | 113885720 A | 1/2022 |
| TW | M463389 U | 10/2013 |

OTHER PUBLICATIONS

Written Opinion of the International Search Authority in International application No. PCT/CN2022/088720,mailed on Nov. 25, 2022.

Chinese Office Action issued in corresponding Chinese Patent Application No. 202210392991.7 dated Mar. 23, 2024, pp. 1-12.

\* cited by examiner

BEAM TRANSMITTER AND OPTICAL TOUCH DISPLAY SYSTEM

FIELD OF INVENTION

The present disclosure relates to the field of display technologies, and more particularly, to a beam transmitter and an optical touch display system.

BACKGROUND OF INVENTION

Display technologies are widely used in various fields of society, and people's demand for interactive display technologies is increasing day by day. Touch display technologies have been widely used commercially, but they have a problem of being unable to realize a remote interaction. One remote interaction technique realizes the remote interaction by motion capture analysis via cameras. However, the accuracy of its recognition is low, which will cause insensitive response, misoperation, and other phenomena that seriously affect user experiences. Another remote interaction technique is "air mouse". "Air mouse" can only recognize relative positions and cannot intuitively feedback absolute position coordinates.

A proximal interaction usually uses capacitive display panels for touch interaction, and since this structure cannot perform the remote interaction, a touch display system that can combine the remote interaction and the proximal interaction is urgently needed.

Technical problem: an embodiment of the present disclosure provides a beam transmitter and an optical touch display system, which can solve following technical problems: people's demand for the interactive display technologies is increasing day by day, and touch display technologies have been widely used commercially, but they are unable to realize the remote interaction, thereby urgently needing the touch display system that can combine the remote interaction and the proximal interaction.

SUMMARY OF INVENTION

To solve the above problems, an embodiment of the present disclosure provides following technical solutions:

An embodiment of the present disclosure provides a beam transmitter, which includes:
  a main body provided with a projecting section;
  a first light source disposed on the main body and configured to emit infrared light and a second light source disposed on the main body and configured to emit visible light, wherein, a projection state of the beam transmitter includes a first projection state of projecting the infrared light from the projecting section and a second projection state of projecting the visible light from the projecting section;
  a power supply component disposed on the main body and connected to the first light source and the second light source;
  a touch sensor disposed on the main body; and
  a control module disposed on the main body and connected to the power supply component, the touch sensor, the first light source, and the second light source, wherein, the control module is configured to control the beam transmitter to switch between the first projection state and the second projection state according to a state of the touch sensor.

In an embodiment, the touch sensor includes a responsive state and a non-responsive state, when the touch sensor is in the responsive state, the control module controls the beam transmitter to be in the first projection state, and when the touch sensor is in the non-responsive state, the control module controls the beam transmitter to be in the second projection state.

In an embodiment, the first light source includes a first control switch, the second light source includes a second control switch, and both the first control switch and the second control switch are connected to the control module.

In an embodiment, the main body includes an accommodating section, the projecting section includes a first projecting section and a second projecting section, and both the first projecting section and the second projecting section intercommunicate with the accommodating section;
  the first light source is disposed in the accommodating section, and the infrared light emitted by the first light source is projected by the first projecting section; the second light source is disposed in the accommodating section, and the visible light emitted by the second light source is projected by the second projecting section; and the touch sensor is disposed at a projection port of the first projecting section.

In an embodiment, the touch sensor includes a pressure-sensitive sensor, and the pressure-sensitive sensor is disposed around the projection port of the first projecting section.

In an embodiment, the first projecting section and the second projecting section are respectively disposed at both ends of the accommodating section, and the projection port of the first projecting section and a projection port of the second projecting section are disposed opposite to each other.

In an embodiment, the visible light and the infrared light projected by the beam transmitter both include at least two different polarization directions.

In an embodiment, the beam transmitter further includes a third light source configured to emit auxiliary light and a beam-bundling structure disposed at a projection port of the projecting section, the infrared light emitted by the first light source and the visible light emitted by the second light source are both parallel to the auxiliary light, and a light-emitting side of the third light source is provided with a half-wave plate;
  the infrared light emitted by the first light source and the auxiliary light emitted by the third light source are projected in a linearly polarized light state by the beam-bundling structure; and/or
  the visible light emitted by the second light source and the auxiliary light emitted by the third light source are projected in the linearly polarized light state by the beam-bundling structure.

In an embodiment, the beam transmitter further includes a quarter-wave plate disposed at a projection port of the projecting section, and the infrared light emitted by the first light source and/or the visible light emitted by the second light source is projected in a circularly polarized light state by the quarter-wave plate.

The present disclosure further provides an optical touch display system, which includes:
  a beam transmitter including:
  a main body provided with a projecting section;
  a first light source disposed on the main body and configured to emit infrared light and a second light source disposed on the main body and configured to emit visible light, wherein, a projection state of the beam transmitter includes a first projection state of projecting the infrared light from the projecting section and a second projection state of projecting the visible light
from the projecting section;
a power supply component disposed on the main body
and connected to the first light source and the second
light source;
a touch sensor disposed on the main body; and
a control module disposed on the main body and connected to the power supply component, the touch sensor, the first light source, and the second light source, wherein, the control module is configured to control the projection state of the beam transmitter to switch between the first projection state and the second projection state according to a state of the touch sensor; and
an optical touch display panel including a display functional section, a photosensitive circuit, and a control unit, wherein, the photosensitive circuit includes a plurality of photosensitive units disposed on the display functional section at intervals, and the display functional section and the photosensitive circuit are respectively connected to the control unit; and
the photosensitive circuit is configured to sense light projected by the beam transmitter and transmit an inductive signal to the control unit, and the control unit is configured to control the display functional section to display on a position where the beam transmitter projects the light according to the inductive signal.

In an embodiment, the light projected by the beam transmitter is irradiated on the optical touch display panel, and the light projected by the beam transmitter covers at least four of the photosensitive units.

In an embodiment, the touch sensor includes a responsive state and a non-responsive state, when the touch sensor is in the responsive state, the control module controls the beam transmitter to be in the first projection state, and when the touch sensor is in the non-responsive state, the control module controls the beam transmitter to be in the second projection state.

In an embodiment, the first light source includes a first control switch, the second light source includes a second control switch, and both the first control switch and the second control switch are connected to the control module.

In an embodiment, the main body includes an accommodating section, the projecting section includes a first projecting section and a second projecting section, and both the first projecting section and the second projecting section intercommunicate with the accommodating section;
the first light source is disposed in the accommodating section, and the infrared light emitted by the first light source is projected by the first projecting section; the second light source is disposed in the accommodating section, and the visible light emitted by the second light source is projected by the second projecting section; and the touch sensor is disposed at a projection port of the first projecting section.

In an embodiment, the touch sensor includes a pressure-sensitive sensor, and the pressure-sensitive sensor is disposed around the projection port of the first projecting section.

In an embodiment, the first projecting section and the second projecting section are respectively disposed at both ends of the accommodating section, and the projection port of the first projecting section and a projection port of the second projecting section are disposed opposite to each other.

In an embodiment, the visible light and the infrared light projected by the beam transmitter both include at least two different polarization directions.

In an embodiment, the beam transmitter further includes a third light source configured to emit auxiliary light and a beam-bundling structure disposed at a projection port of the projecting section, the infrared light emitted by the first light source and the visible light emitted by the second light source are both parallel to the auxiliary light, and a light-emitting side of the third light source is provided with a half-wave plate;
the infrared light emitted by the first light source and the auxiliary light emitted by the third light source are projected in a linearly polarized light state by the beam-bundling structure; and/or
the visible light emitted by the second light source and the auxiliary light emitted by the third light source are projected in the linearly polarized light state by the beam-bundling structure.

In an embodiment, the beam-bundling structure includes a convex lens.

In an embodiment, the beam transmitter further includes a quarter-wave plate disposed at a projection port of the projecting section, and the infrared light emitted by the first light source and/or the visible light emitted by the second light source is projected in a circularly polarized light state by the quarter-wave plate.

Beneficial effect: the present disclosure disposes the beam transmitter, which includes the main body, the first light source and the second light source disposed in the main body, the power supply component connected to the first light source and the second light source, the touch sensor, and the control module. The projection state of the beam transmitter includes the first projection state of projecting the infrared light and the second projection state of projecting the visible light. The control module is configured to control the projection state of the beam transmitter to switch between the first projection state and the second projection state according to the state of the touch sensor. This setting allows the beam transmitter to have two use modes of remote interaction and proximal interaction and to be able to automatically switch the projection state according to practical usage requirements, thereby making better user experiences.

DETAILED DESCRIPTION OF PREFERRED EMBODIMENTS

The present disclosure provides a beam transmitter and an optical touch display system. In order to make the purpose, technical solutions, and effects of the present disclosure clearer and more definite, the following further describes the present disclosure in detail with reference to the drawings and embodiments. It should be understood that the specific embodiments described herein are only used to explain the disclosure and are not used to limit the disclosure.

An embodiment of the present disclosure provides a beam transmitter and an optical touch display system. They will be described in detail in the following. It should be noted that an order of description in the following embodiments is not meant to limit a preferred order of the embodiments.

Figure 1:
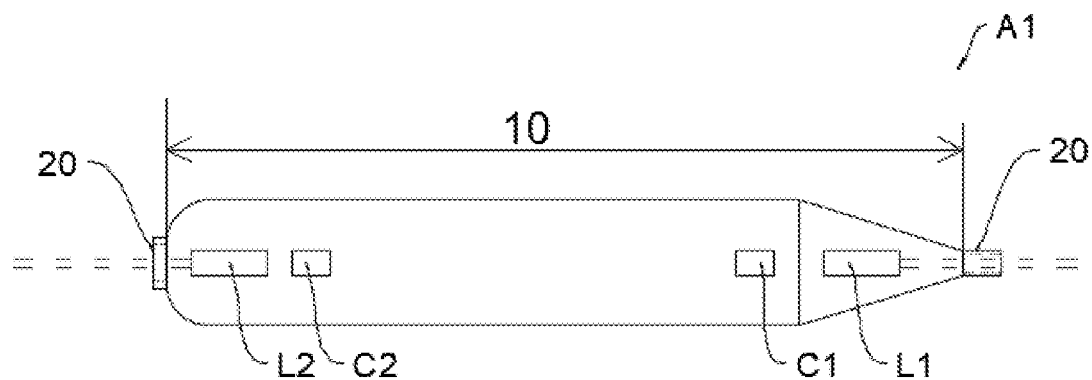
FIG. 1 is a schematic structural diagram of a beam transmitter according to an embodiment of the present disclosure.

As shown in FIG. 1, an embodiment of the present disclosure provides a beam transmitter A1, specifically referring to FIGS. 1 to 6, which includes:

a main body 10 provided with a projecting section 20;

a first light source L1 disposed on the main body 10 and configured to emit infrared light and a second light source L2 disposed on the main body 10 and configured to emit visible light, wherein, a projection state of the beam transmitter A1 includes a first projection state of projecting the infrared light from the projecting section 20 and a second projection state of projecting the visible light from the projecting section 20;

a power supply component 100 disposed on the main body 10 and connected to the first light source L1 and the second light source L2;

a touch sensor 300 disposed on the main body 10; and a control module 200 disposed on the main body 10 and connected to the power supply component 100, the touch sensor 300, the first light source L1, and the second light source L2, wherein, the control module 200 is configured to control the projection state of the beam transmitter A1 to switch between the first projection state and the second projection state according to a state of the touch sensor 300.

Specifically, the beam transmitter A1 includes the main body 10, and the main body 10 includes a housing and an accommodating section inside the housing. The accommodating section is configured to dispose the first light source L1, the second light source L2, the power supply component 100, and the control module 200. The touch sensor 300 may be disposed in the accommodating section or in the projecting section 20.

Specifically, the first light source L1 is used to emit infrared light, and a wavelength of the infrared light is one of 980 nm, 808 nm, or 850 nm.

Specifically, the second light source L2 is used to emit visible light, and the visible light may be one of red light, orange light, yellow light, green light, blue light, cyan light, violet light, or other color light. The types and wavelengths of the visible light and invisible light may be designed according to sensitive sections of photosensitive units SD on a touch display panel A2 in actual situations, and red light is preferred.

Figure 2:
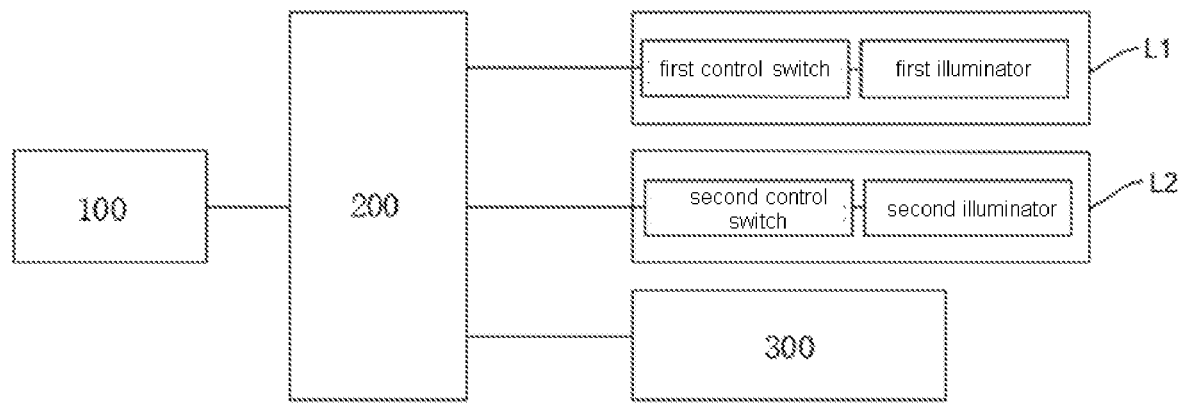
FIG. 2 is a schematic connection diagram of a control module of the beam transmitter according to an embodiment of the present disclosure.

Specifically, as shown in FIG. 2, the control module 200 is connected to the power supply component 100, the touch sensor 300, the first light source L1, and the second light source L2. The power supply component 100 is used to supply power to the control module 200, the touch sensor 300, the first light source L1, and the second light source L2. The control module 200 controls working states of the first light source L1 and the second light source L2, and specifically adjusts the working states of the first light source L1 and the second light source L2 according to a state of the touch sensor 300.

Specifically, the touch sensor 300 includes a responsive state and a non-responsive state. The control module 200 adjusts the projection state of the beam transmitter A1 according to the state of the touch sensor 300, that is, projecting the infrared light or the visible light. Projecting the infrared light is a proximal interaction mode, and projecting the visible light is a remote interaction mode.

Specifically, the touch sensor 300 may include a distance sensor. The touch sensor 300 may be disposed in the accommodating section or in the projecting section 20. In a specific embodiment, the touch sensor 300 may be an ultrasonic proximity switch. By reasonably setting a sensing distance of the ultrasonic proximity switch, when the beam transmitter A1 is close to the touch display panel A2, the ultrasonic proximity switch is in the responsive state, the control module 200 controls the first light source L1 to be in a state of emitting the infrared light, and the second light source L2 is turned off, thereby realizing the proximal interaction. When the ultrasonic proximity switch is out of the sensing distance, the ultrasonic proximity switch is in the non-responsive state, the control module 200 controls the second light source L2 to be in a state of emitting the visible light, and the first light source L1 is turned off, thereby realizing the remote interaction.

Figure 3:
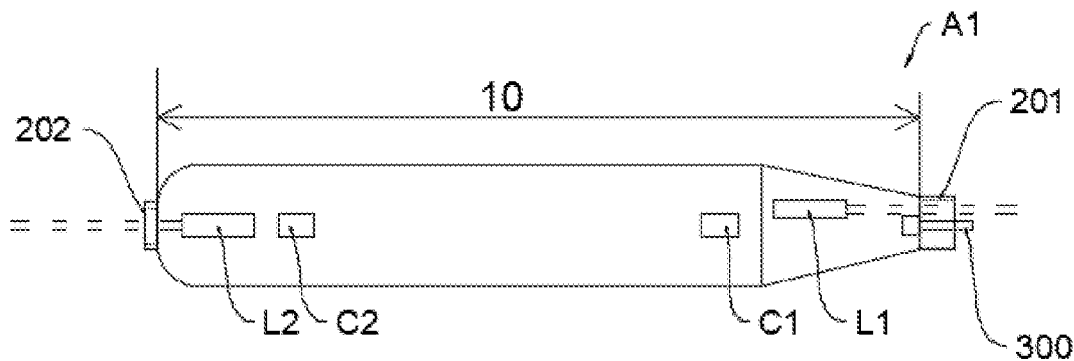
FIG. 3 is another schematic structural diagram of the beam transmitter according to an embodiment of the present disclosure.

Specifically, as shown in FIG. 3, the touch sensor 300 may include a pressure-sensitive sensor, and in a specific embodiment, the touch sensor 300 may be one of a telescopic pressure-sensitive sensor, a capacitive pressure-sensitive sensor, or a piezoelectric pressure-sensitive sensor. Preferably, as shown in FIG. 3, the touch sensor 300 is disposed on the projecting section 20. When the pressure-sensitive sensor of the beam transmitter A1 is in contact with touch display panel A2 and a squeeze operation occurs, the pressure-sensitive sensor is in the responsive state, the control module 200 controls the first light source L1 to be in the state of emitting the infrared light, and the second light source L2 is turned off, thereby realizing the proximal interaction. When the pressure-sensitive sensor is in a suspended state away from the touch display panel A2, the pressure-sensitive sensor is in the non-responsive state, the control module 200 controls the second light source L2 to be in the state of emitting the visible light, and the first light source L1 is turned off, thereby realizing the remote interaction.

It can be understood that this embodiment disposes the beam transmitter A1, which includes the main body 10, the first light source L1 and the second light source L2 disposed in the main body 10, the power supply component 100 connected to the first light source L1 and the second light source L2, the touch sensor 300, and the control module 200. The projection state of the beam transmitter A1 includes the first projection state of projecting the infrared light and the second projection state of projecting the visible light. The control module 200 is configured to control the projection state of the beam transmitter A1 to switch between the first projection state and the second projection state according to the state of the touch sensor 300. This setting allows the beam transmitter A1 to have two use modes of remote interaction and proximal interaction and to be able to automatically switch the projection state according to practical usage requirements, thereby making better user experiences.

In an embodiment, the touch sensor 300 includes the responsive state and the non-responsive state, when the touch sensor 300 is in the responsive state, the control module 200 controls the beam transmitter A1 to be in the first projection state, and when the touch sensor 300 is in the non-responsive state, the control module 200 controls the beam transmitter A1 to be in the second projection state.

Specifically, the responsive state and the non-responsive state of the touch sensor 300 are specifically determined according to the type of the touch sensor 300. For example, when the touch sensor 300 is the pressure-sensitive sensor, the responsive state is that the pressure-sensitive sensor is squeezed and a current signal is generated (when the pressure-sensitive sensor is a capacitive sensor, the capacitance of the sensor changes due to squeeze), and the non-responsive state is that the pressure-sensitive sensor is not squeezed and the current signal is not generated. When the touch sensor 300 is a distance sensor, the distance sensor has a preset distance value. When approaching an obstacle, the sensor receives a returned ultrasonic wave and then generates a current signal, and the state is the responsive state; and the non-responsive state is that a distance between the distance sensor and the obstacle is greater than the preset distance value, a returned ultrasonic wave is not received, and no current signal is generated.

It should be noted that in an optical touch display system, a difference between the proximal interaction and the remote interaction is that the remote interaction may be understood as a remote identification, and the proximal interaction may be understood as a writing mode.

It can be understood that by adopting a suitable touch sensor 300, the beam transmitter A1 can automatically switch a working state according to actual needs of users, thereby improving user experiences. Since reflection of laser light into human eyes is easy to cause damage to the human eyes, setting the proximal interaction to use the infrared light can reduce the damage to the human eyes caused by the laser light emitted by beam transmitters A1.

In an embodiment, as shown in FIG. 2, the first light source L1 includes a first control switch C1, the second light source L2 includes a second control switch C2, and both the first control switch C1 and the second control switch C2 are connected to the control module 200.

Specifically, the first light source L1 includes the first control switch C1 and a first illuminator connected to the first control switch C1, and the first illuminator includes one of a tungsten lamp, a hydrogen lamp, or a tritium lamp.

Specifically, the second light source L2 includes the second control switch C2 and a second illuminator connected to the second control switch C2, and the second illuminator includes a deuterium lamp. Specifically, the first control switch C1 may be turned on or off by manual control, and may also be turned on or off by the control module 200.

Specifically, the second control switch C2 may be turned on or off by manual control, and may also be turned on or off by the control module 200. It can be understood that turning on or off of the first light source L1 and the second light source L2 can be manually controlled according to the actual needs of the users. Therefore, when the users only need to use a single interaction mode, the light source can be prevented from being switched by mistake due to misoperation, thereby further improving the user experiences, and power of the power supply component 100 can also be saved, thereby improving an energy-saving performance of the beam transmitter.

Figure 4:
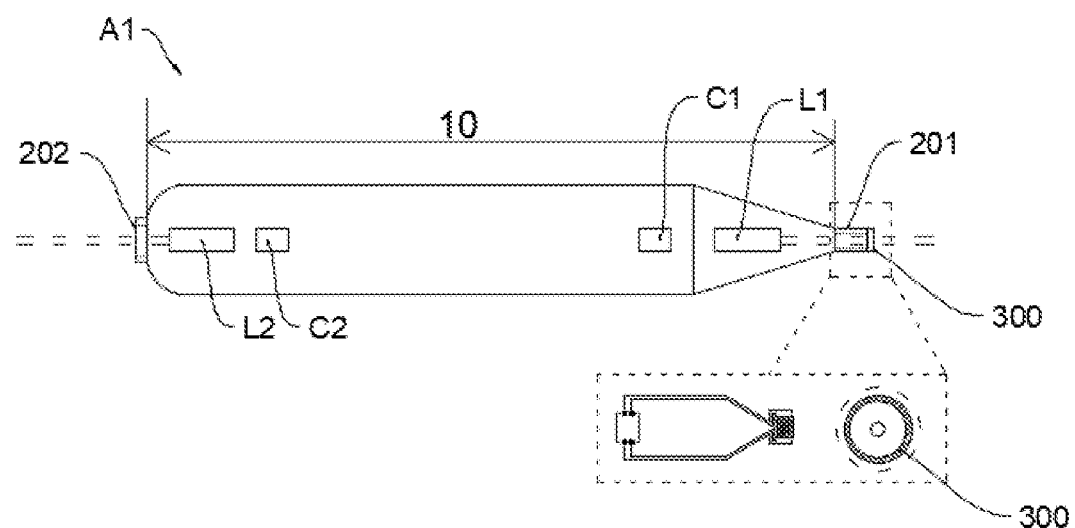
FIG. 4 is yet another schematic structural diagram of the beam transmitter according to an embodiment of the present disclosure.

In an embodiment, as shown in FIGS. 3 and 4, the main body 10 includes the accommodating section, the projecting section 20 includes a first projecting section 201 and a second projecting section 202, and both the first projecting section 201 and the second projecting section 202 intercommunicate with the accommodating section.

The first light source L1 is disposed in the accommodating section, and the infrared light emitted by the first light source L1 is projected by the first projecting section 201. The second light source L2 is disposed in the accommodating section, and the visible light emitted by the second light source L2 is projected by the second projecting section 202. The touch sensor 300 is disposed at a projection port of the first projecting section 201.

Specifically, the first projecting section 201 and the second projecting section 202 may be disposed on a same side of the accommodating section, or the first projecting section 201 and the second projecting section 202 may be respectively disposed on top and bottom sides of the accommodating section.

In a specific embodiment, the first projecting section 201 and the second projecting section 202 may be annular structures. The infrared light emitted by the first light source L1 passes through a hollow area of the annular structure of the first projecting section 201 for projection, and the visible light emitted by the second light source L2 passes through a hollow area of the annular structure of the second projecting section 202 for projection.

It should be noted that since the first projecting section 201 is used for proximal interaction, that is, used as a stylus, the touch sensor 300 may be disposed at the projection port of the first projecting section 201 for proximal interaction. The touch sensor 300 uses the pressure-sensitive sensor, by the pressure generated by writing, the touch sensor 300 can switch between the responsive state and the non-responsive state, and the control module 200 controls the beam transmitter A1 to switch between the proximal interaction mode and the remote interaction mode. In this setting mode, the first projecting section 201 and the second projecting section 202 can be set on the same side of the accommodating section. Meanwhile, the pressure-sensitive sensor may also collect a writing force during the proximal interaction of the beam transmitter A1, and the optical touch display system analyzes and processes the data and feed it back to the optical touch display panel A2 to display depth information during writing, thereby showing a style of writing when writing and further improving the user experiences.

It should be noted that the first projecting section 201 and the second projecting section 202 may be disposed at the top and bottom sides of the accommodating section. In order to prevent the visible light for the remote interaction from irritating user's eyes when the beam transmitter A1 switches between different modes, in this structure, the second control switch C2 of the second light source L2 for the remote interaction can be manually turned off. In this situation, the first light source L1 for the proximal interaction can be switched between turning on and off, and when not writing, the power supply of the first light source L1 that emits the infrared light can be disconnected in time, thereby reducing energy consumption of the beam transmitter A1.

It should be noted that a technical solution of displaying a touch depth on the touch display panel A2 by sense of the pressure-sensitive sensor may be: the pressure-sensitive sensor generates a pressure-sensitive electrical signal, a wireless signal transmitting module built in the beam transmitter A1 transmits the pressure-sensitive electrical signal, and a wireless signal receiving module built in the touch display panel A2 receives the pressure-sensitive electrical signal and transmits it to a control unit A22. The control unit A22 may include a central processing module and a digital signal processing module, the digital signal processing module converts the pressure-sensitive electrical signal into a pressure-sensitive digital signal, and the pressure-sensitive digital signal is analyzed by the central processing module and displayed on the optical touch display panel A2. Different touch depths at corresponding positions are displayed according to a strength of received pressure-sensitive electrical signal. For example, the control unit A22 may be a system-on-chip (SOC). By setting the SOC in the optical touch display system, when the proximal interaction is realized, the optical touch display system can display the depth information of writing.

It can be understood that by disposing the touch sensor 300 at the projection port of the first projecting section 201 for the proximal interaction, the touch sensor 300 for switching between the remote interaction and the proximal interaction and the pressure-sensitive sensor for displaying writing depths can be combined into one. That is, two functions can be realized by one pressure-sensitive sensor, which reduces the production cost and makes the structure of the beam transmitter A1 more compact.

In an embodiment, as shown in FIG. 4, the touch sensor 300 includes a pressure-sensitive sensor, and the pressure-sensitive sensor is disposed around the projection port of the first projecting section 201.

Specifically, the pressure-sensitive sensor is disposed around the projection port of the first projecting section 201, so the infrared light passing through the first projecting section 201 is surrounded by the pressure-sensitive sensor. Therefore, users can hold a pen in any way or at any inclined angle, the writing force can be sensitively detected, and the depth detection (that is, strokes of writing) can be displayed more accurate.

It can be understood that by disposing the pressure-sensitive sensor to surround the projection port of the first projecting section 201, the accuracy of the pressure-sensitive sensor detecting the writing force can be improved. Compared to the telescopic pressure-sensitive sensor shown in FIG. 3, this setting can avoid correcting a deviation between actual writing positions of a pen tip and actual irradiation points of the infrared light using a program, thereby improving the accuracy of the proximal interaction, that is, the writing positions, and improving the user experiences.

In an embodiment, the first projecting section 201 and the second projecting section 202 are respectively disposed at both ends of the accommodating section, and the projection port of the first projecting section 201 and a projection port of the second projecting section 202 are disposed opposite to each other.

It can be understood that by the above setting, the structure of the beam transmitter A1 can be more reasonable, and a diameter of the beam transmitter A1 is thinner. In the case of not affecting the actual use, it makes a user's hand feel better when the user is in the proximal interaction (that is, writing), thereby improving the user experiences.

Figure 5:
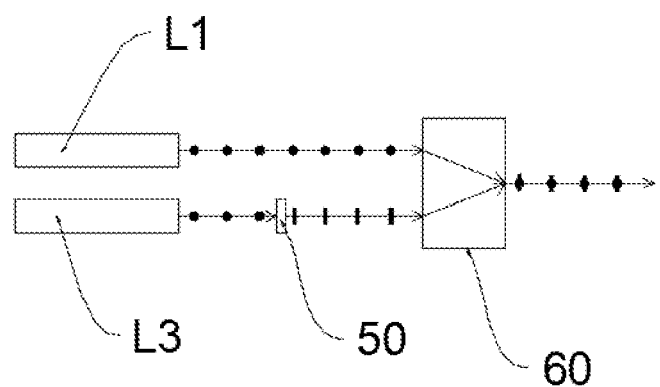
FIG. 5 is a schematic diagram of the beam transmitter projecting linearly polarized light according to an embodiment of the present disclosure.
Figure 6:
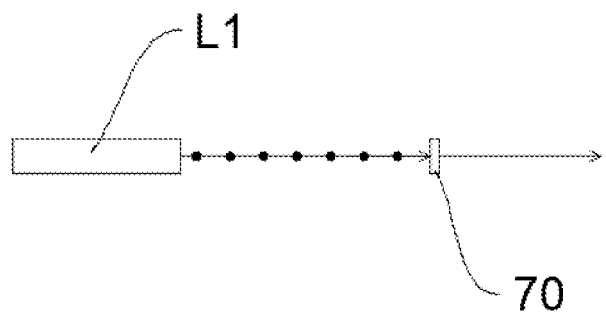
FIG. 6 is a schematic diagram of the beam transmitter projecting linearly polarized light according to an embodiment of the present disclosure.
Figure 7:
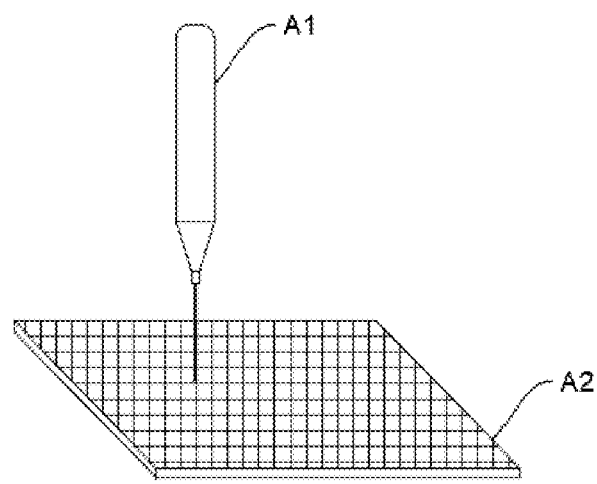
FIG. 7 is a schematic diagram of a remote interaction mode of an optical touch display system according to an embodiment of the present disclosure.

In an embodiment, as shown in FIGS. 5 and 6, the visible light and the infrared light projected by the beam transmitter A1 both include at least two different polarization directions.

It should be noted that an outer layer of the touch display panel A2 is a polarizing film, and when integrated photo-sensitive units SD are disposed inside the display panel, laser light (the visible light and the infrared light) emitted by the beam transmitter A1 is irradiated on the polarizing film first and reaches interior sensors after passing through the polarizing film. When a polarizing angle of the laser light is orthogonal to an angle of the polarizing film, the laser light cannot pass through the polarizing film, and the photosensitive units SD cannot obtain corresponding laser information, resulting in unidentifiable problems. In order to solve the above problem, the technical solution in this embodiment is provided.

It can be understood that by performing linear polarization processing on the light projected by the beam transmitter A1, when the projected light (the visible light and infrared light) has at least two different polarization directions, it can be ensured that the projected light incident on the touch display panel A2 from any angle will always have partial light being able to pass through the polarizing film and reach the photosensitive units SD on the touch display panel A2, thereby preventing that only a few photosensitive devices on the touch display panel A2 can receive light signals or even all photosensitive devices cannot receive light signals. Therefore, the positioning accuracy and sensitivity of the display panel can be improved.

In an embodiment, the beam transmitter A1 further includes a third light source L3 configured to emit auxiliary light and a beam-bundling structure 60 disposed at a projection port of the projecting section 20, the infrared light emitted by the first light source L1 and the visible light emitted by the second light source L2 are both parallel to the auxiliary light, and a light-emitting side of the third light source L3 is provided with a half-wave plate 50.

The infrared light emitted by the first light source L1 and the auxiliary light emitted by the third light source L3 are projected in a linearly polarized light state by the beam-bundling structure 60; and/or the visible light emitted by the second light source L2 and the auxiliary light emitted by the third light source L3 are projected in the linearly polarized light state by the beam-bundling structure 60.

Specifically, the auxiliary light emitted by the third light source L3 may be either infrared light or visible light, which can be adjusted according to actual needs.

Specifically, the beam-bundling structure 60 may be a beam-bundling lens, such as a convex lens, and two beams of light (the auxiliary light and the infrared light/visible light) converge into one beam after passing through the beam-bundling structure 60. Therefore, on the premise that a diameter of the beam emitted by the beam transmitter A1 remains unchanged, a light intensity of the projected light emitted by the beam transmitter A1 can be enhanced to make the projected light more penetrating, thereby facilitating the photosensitive units SD on the touch display panel A2 to sense the projected light.

It can be understood that the positioning accuracy and sensitivity of the display panel can be improved by performing linear polarization processing on the light projected by the beam transmitter A1.

In an embodiment, the beam transmitter A1 further includes a quarter-wave plate 70 disposed at the projection port of the projecting section 20, and the infrared light emitted by the first light source L1 and/or the visible light emitted by the second light source L2 is projected in a circularly polarized light state by the quarter-wave plate 70.

Specifically, as shown in FIG. 6, in FIG. 6, the first light source L1 is taken as an example for description. Of course, the light source may also be replaced by the second light source L2. The quarter-wave plate 70 may be embedded in the hollow positions of the annular first projecting section 201 and the annular second projecting section 202.

It can be understood that the positioning accuracy and sensitivity of the display panel can be improved by performing linear polarization processing on the light projected by the beam transmitter A1.

The present disclosure further provides an optical touch display system, as shown in FIGS. 7 to 10, which includes:
 a beam transmitter A1, as shown in FIG. 1, wherein, the beam transmitter A1 includes:
 a main body 10 provided with a projecting section 20;
 a first light source L1 disposed on the main body 10 and configured to emit infrared light and a second light source L2 disposed on the main body 10 and configured to emit visible light, wherein, a projection state of the beam transmitter A1 includes a first projection state of projecting the infrared light and a second projection state of projecting the visible light;
 a power supply component 100 disposed on the main body 10 and connected to the first light source L1 and the second light source L2;
 a touch sensor 300 disposed on the main body 10; and
 a control module 200 disposed on the main body 10 and connected to the power supply component 100, the touch sensor 300, the first light source L1, and the second light source L2, wherein, the control module 200 is configured to control the projection state of the beam transmitter A1 to switch between the first projection state and the second projection state according to a state of the touch sensor 300.

Figure 8:
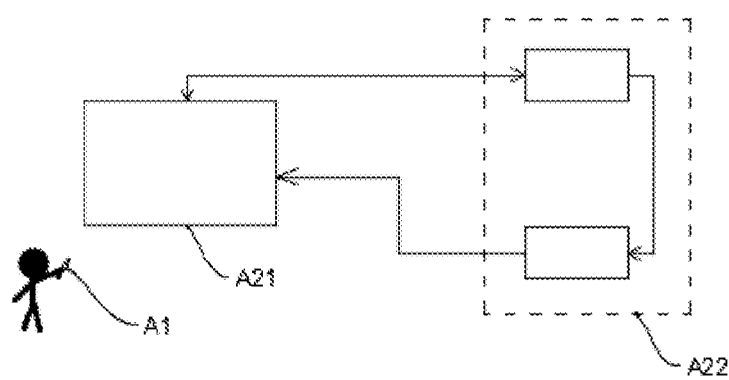
FIG. 8 is a schematic diagram of a remote interaction of the optical touch display system according to an embodiment of the present disclosure.
Figure 9:
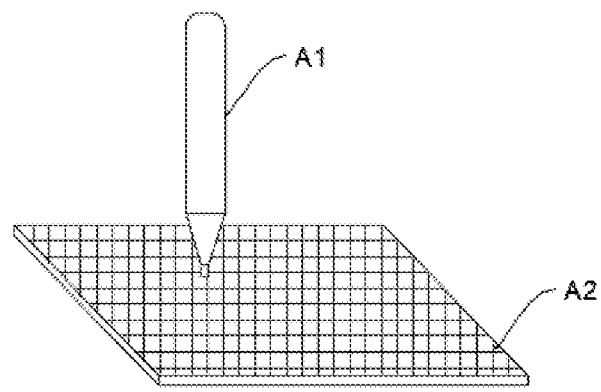
FIG. 9 is a schematic diagram of a proximal interaction mode of the optical touch display system according to an embodiment of the present disclosure.
Figure 10:
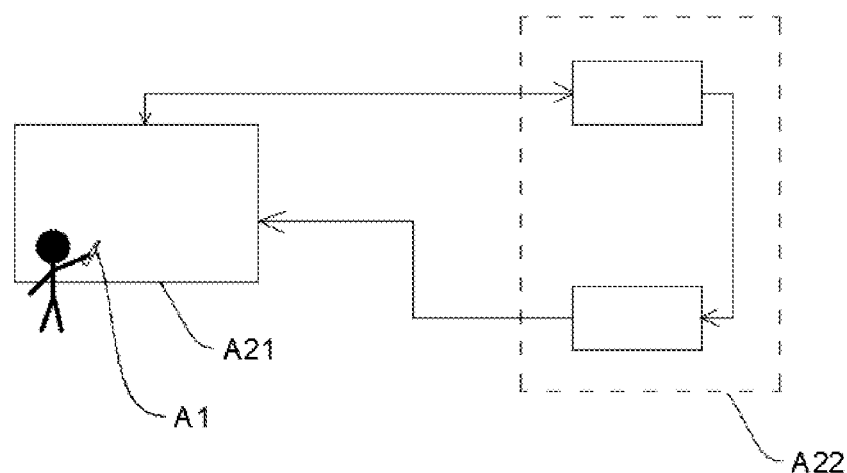
FIG. 10 is a schematic diagram of a proximal interaction of the optical touch display system according to an embodiment of the present disclosure.

As shown in FIGS. 8 and 10, FIG. 8 is a schematic diagram of a remote interaction, and FIG. 10 is a schematic diagram of a proximal interaction. an optical touch display panel A2 including a display functional section A21, a photosensitive circuit, and a control unit A22, wherein, the photosensitive circuit includes a plurality of photosensitive units SD disposed on the display functional section A21 at intervals, and the display functional section A21 and the photosensitive circuit are respectively connected to the control unit A22; and
 the photosensitive circuit is configured to sense light projected by the beam transmitter A1 and transmit an inductive signal to the control unit A22, and the control unit A22 is configured to control the display functional section A21 to display on a position where the beam transmitter A1 projects the light according to the inductive signal.

Specifically, the structure of the beam transmitter A1 may referred to the structure and setting method in the above embodiments, and is not repeated herein.

Specifically, a photosensitive function of the photosensitive circuit is realized by the plurality of photosensitive units SD disposed on the display functional section A21.

Specifically, the optical touch display panel A2 may specifically be a photosensitive functional integrated display panel, which includes the display functional section A21, the photosensitive circuit, and the control unit A22. Wherein, the photosensitive circuit is mainly composed of a photosensitive thin film transistor (Sense TFT), a switch thin film transistor (Switch TFT), a subsequent readout circuit (Readout), and the control unit A22. When a source electrode and a drain electrode of the Switch TFT are turned on, a photocurrent generated by the Sensing TFT after sensing light can be read out and processed. The architecture diagram is shown in FIG. 11.

Figure 11:
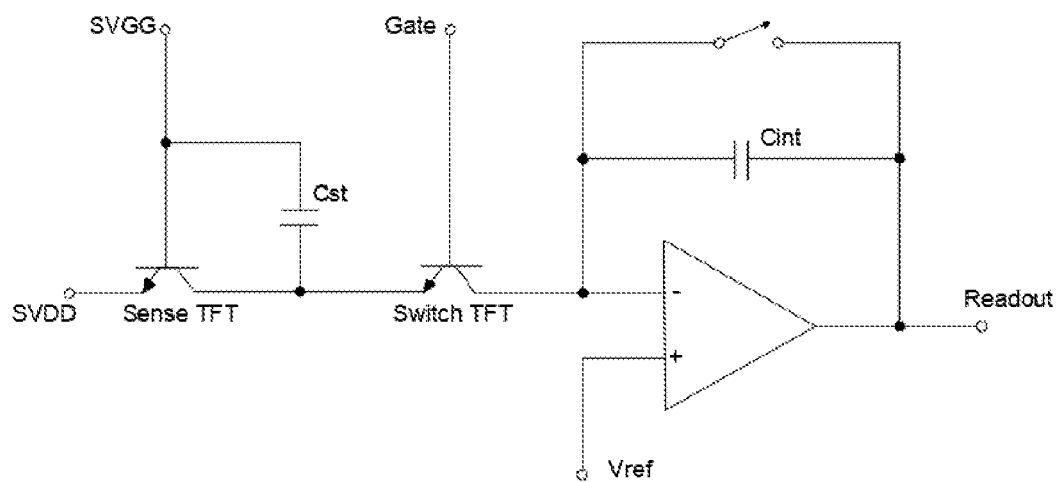
FIG. 11 is a circuit diagram of a photosensitive circuit of an optical touch display panel according to an embodiment of the present disclosure.

In FIG. 11, the photosensitive circuit includes the photosensitive thin film transistor, the switch thin film transistor, and a first capacitor Cst (a storage capacitor). A gate electrode of the photosensitive thin film transistor is connected to a first control signal line SVGG, a source electrode of the photosensitive thin film transistor is connected to a first power supply line SVDD, and a drain electrode of the photosensitive thin film transistor is connected to the source electrode of the switch thin film transistor. The first capacitor Cst includes a first plate and a second plate, the first plate is connected to the drain electrode of the photosensitive thin film transistor and the source electrode of the switch thin film transistor, and the second plate is connected to a common voltage signal line Vcom.

The photosensitive circuit further includes the readout circuit, the drain electrode of the switch thin film transistor is connected to the readout circuit, and the gate electrode of the switch thin film transistor is connected to a second control signal line Gate.

The readout circuit includes an operational amplifier, a second capacitor Cint, and a switch. The operational amplifier includes an inverting input terminal, a non-inverting input terminal, and an output terminal (in the operational amplifier shown in FIG. 11, "−" means the inverting input terminal, and "+" means the non-inverting input terminal), the non-inverting input terminal is connected to a reference voltage Vref, and the inverting input terminal is connected to the drain electrode of the switch thin film transistor. Both the second capacitor Cint and the switch are connected in parallel with the operational amplifier FD, one end of the second capacitor Cint and one end of the switch are both connected to the inverting input terminal of the operational amplifier, and another end of the second capacitor Cint and another end of the switch are both connected to the output terminal of the operational amplifier. The output terminal of the operational amplifier is further connected to a readout line Readout, and the readout line Readout is used for outputting photosensitive signals.

It can be understood that disposition of the beam transmitter A1 in corporation with the optical touch display panel A2 to form the optical touch display system allows the optical touch display system to have two use modes of remote interaction and proximal interaction and to be able to automatically switch the projection state according to practical usage requirements, thereby making better user experiences.

Figure 12:
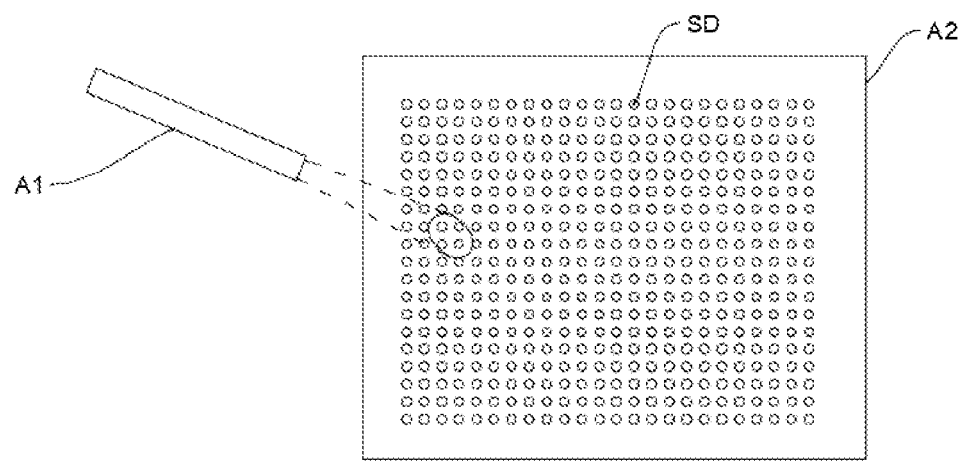
FIG. 12 is a schematic diagram of an interaction mode of the optical touch display system according to an embodiment of the present disclosure.

In an embodiment, as shown in FIG. 12, the light projected by the beam transmitter A1 is irradiated on the optical touch display panel A2, and the light projected by the beam transmitter A1 covers at least four of the photosensitive units SD.

Specifically, a light spot size of the light projected by the beam transmitter A1 on the optical touch display panel A2 is larger than a size of the photosensitive units SD, and at any time, the light projected by the beam transmitter A1 covers at least four of the photosensitive units SD.

It should be noted that the light projected by the beam transmitter A1 is set to cover at least four of the photosensitive units SD, and by the four photosensitive units SD, specific coordinates of the display panel corresponding to the light projected by the beam transmitter A1 can be accurately calculated, for example (X, Y). When the light projected by the beam transmitter A1 covers only two of the photosensitive units SD, only a position of a single direction of the display panel corresponding to the light projected by the beam transmitter A1 can be calculated.

It can be understood that by setting the light projected by the beam transmitter A1 to cover at least four of the photosensitive units SD, an exact position of the light projected by the beam transmitter can be simulated using the center of gravity algorithm according to different light intensities received by the photosensitive units SD at different positions.

In summary, the present disclosure disposes the beam transmitter A1, which includes the main body 10, the first light source L1 and the second light source L2 disposed in the main body 10, the power supply component 100 connected to the first light source L1 and the second light source L2, the touch sensor 300, and the control module 200. The projection state of the beam transmitter A1 includes the first projection state of projecting the infrared light and the second projection state of projecting the visible light. The control module 200 is configured to control the projection state of the beam transmitter A1 to switch between the first projection state and the second projection state according to the state of the touch sensor 300. This setting allows the beam transmitter A1 to have two use modes of remote interaction and proximal interaction and to be able to automatically switch the projection state according to practical usage requirements, thereby making better user experiences.

The beam transmitter and the optical touch display system provided in the embodiments of the present disclosure are described in detail above. Specific examples are used herein to explain the principles and implementation of the present disclosure. The descriptions of the above embodiments are only used to help understand the method of the present disclosure and its core ideas; meanwhile, for those skilled in the art, the range of specific implementation and application may be changed according to the ideas of the present disclosure. In summary, the content of the specification should not be construed as causing limitations to the present disclosure.

What is claimed is:

1. A beam transmitter, comprising:
a main body provided with a projecting section;
a first light source disposed on the main body and configured to emit infrared light and a second light source disposed on the main body and configured to emit visible light, wherein a projection state of the beam transmitter comprises a first projection state of projecting the infrared light from the projecting section and a second projection state of projecting the visible light from the projecting section;
a power supply component disposed on the main body and connected to the first light source and the second light source;
a touch sensor disposed on the main body; and
a controller disposed on the main body and connected to the power supply component, the touch sensor, the first light source, and the second light source, wherein the controller is configured to control the beam transmitter to switch between the first projection state and the second projection state according to a state of the touch sensor.

2. The beam transmitter according to claim 1, wherein the touch sensor comprises a responsive state and a non-responsive state, when the touch sensor is in the responsive state, the controller controls the beam transmitter to be in the first projection state, and when the touch sensor is in the non-responsive state, the controller controls the beam transmitter to be in the second projection state.

3. The beam transmitter according to claim 2, wherein the first light source comprises a first control switch, the second light source comprises a second control switch, and both the first control switch and the second control switch are connected to the controller.

4. The beam transmitter according to claim 3, wherein the main body comprises an accommodating section, the projecting section comprises a first projecting section and a second projecting section, and both the first projecting section and the second projecting section intercommunicate with the accommodating section;
the first light source is disposed in the accommodating section, and the infrared light emitted by the first light source is projected by the first projecting section; the second light source is disposed in the accommodating section, and the visible light emitted by the second light source is projected by the second projecting section; and the touch sensor is disposed at a projection port of the first projecting section.

5. The beam transmitter according to claim 4, wherein the touch sensor comprises a pressure-sensitive sensor, and the pressure-sensitive sensor is disposed around the projection port of the first projecting section.

6. The beam transmitter according to claim 4, wherein the first projecting section and the second projecting section are respectively disposed at both ends of the accommodating section, and the projection port of the first projecting section and a projection port of the second projecting section are disposed opposite to each other.

7. The beam transmitter according to claim 1, wherein the visible light and the infrared light projected by the beam transmitter both comprise at least two different polarization directions.

8. The beam transmitter according to claim 7, further comprising a third light source configured to emit auxiliary light and a beam-bundling structure disposed at a projection port of the projecting section, wherein the infrared light emitted by the first light source and the visible light emitted by the second light source are both parallel to the auxiliary light, and a light-emitting side of the third light source is provided with a half-wave plate;
the infrared light emitted by the first light source and the auxiliary light emitted by the third light source are projected in a linearly polarized light state by the beam-bundling structure; and
the visible light emitted by the second light source and the auxiliary light emitted by the third light source are projected in the linearly polarized light state by the beam-bundling structure.

9. The beam transmitter according to claim 7, further comprising a quarter-wave plate disposed at a projection port of the projecting section, wherein the infrared light emitted by the first light source or the visible light emitted by the second light source is projected in a circularly polarized light state by the quarter-wave plate.

10. An optical touch display system, comprising:
a beam transmitter comprising:
a main body provided with a projecting section;
a first light source disposed on the main body and configured to emit infrared light and a second light source disposed on the main body and configured to emit visible light, wherein a projection state of the beam transmitter comprises a first projection state of projecting the infrared light from the projecting section and a second projection state of projecting the visible light from the projecting section;
a power supply component disposed on the main body and connected to the first light source and the second light source;
a touch sensor disposed on the main body; and
a controller disposed on the main body and connected to the power supply component, the touch sensor, the first light source, and the second light source, wherein the controller is configured to control the projection state of the beam transmitter to switch between the first projection state and the second projection state according to a state of the touch sensor; and
an optical touch display panel comprising a display functional section, a photosensitive circuit, and a control unit, wherein the photosensitive circuit comprises a plurality of photosensitive units disposed on the display functional section at intervals, and the display functional section and the photosensitive circuit are respectively connected to the control unit; and
the photosensitive circuit is configured to sense light projected by the beam transmitter and transmit an inductive signal to the control unit, and the control unit is configured to control the display functional section to display on a position where the beam transmitter projects the light according to the inductive signal.

11. The optical touch display system according to claim 10, wherein the light projected by the beam transmitter is irradiated on the optical touch display panel, and the light projected by the beam transmitter covers at least four of the photosensitive units.

12. The optical touch display system according to claim 10, wherein the touch sensor comprises a responsive state and a non-responsive state, when the touch sensor is in the responsive state, the controller controls the beam transmitter to be in the first projection state, and when the touch sensor is in the non-responsive state, the controller controls the beam transmitter to be in the second projection state.

13. The optical touch display system according to claim 12, wherein the first light source comprises a first control switch, the second light source comprises a second control switch, and both the first control switch and the second control switch are connected to the controller.

14. The optical touch display system according to claim 13, wherein the main body comprises an accommodating section, the projecting section comprises a first projecting section and a second projecting section, and both the first projecting section and the second projecting section intercommunicate with the accommodating section;
the first light source is disposed in the accommodating section, and the infrared light emitted by the first light source is projected by the first projecting section; the second light source is disposed in the accommodating section, and the visible light emitted by the second light source is projected by the second projecting section; and the touch sensor is disposed at a projection port of the first projecting section.

15. The optical touch display system according to claim 14, wherein the touch sensor comprises a pressure-sensitive sensor, and the pressure-sensitive sensor is disposed around the projection port of the first projecting section.

16. The optical touch display system according to claim 14, wherein the first projecting section and the second projecting section are respectively disposed at both ends of the accommodating section, and the projection port of the first projecting section and a projection port of the second projecting section are disposed opposite to each other.

17. The optical touch display system according to claim 10, wherein the visible light and the infrared light projected by the beam transmitter both comprise at least two different polarization directions.

18. The optical touch display system according to claim 17, wherein the beam transmitter further comprises a third light source configured to emit auxiliary light and a beam-bundling structure disposed at a projection port of the projecting section, the infrared light emitted by the first light source and the visible light emitted by the second light source are both parallel to the auxiliary light, and a light-emitting side of the third light source is provided with a half-wave plate;
the infrared light emitted by the first light source and the auxiliary light emitted by the third light source are projected in a linearly polarized light state by the beam-bundling structure; and
the visible light emitted by the second light source and the auxiliary light emitted by the third light source are projected in the linearly polarized light state by the beam-bundling structure.

19. The optical touch display system according to claim 18, wherein the beam-bundling structure comprises a convex lens.

20. The optical touch display system according to claim 17, wherein the beam transmitter further comprises a quarter-wave plate disposed at a projection port of the projecting section, and the infrared light emitted by the first light source or the visible light emitted by the second light source is projected in a circularly polarized light state by the quarter-wave plate.

\* \* \* \* \*